United States Patent
Coleman et al.

[11] Patent Number: 5,697,687
[45] Date of Patent: Dec. 16, 1997

[54] PROJECTION TELEVISION SCREEN MOUNTING

[75] Inventors: Clyde Franklin Coleman, Crawfordsville; Thomas Edward Freeman, New Whiteland, both of Ind.

[73] Assignee: Thomson Consumer Electronics, Inc., Indianapolis, Ind.

[21] Appl. No.: 426,596

[22] Filed: Apr. 21, 1995

[51] Int. Cl.$^6$ ................................................. G03B 21/14
[52] U.S. Cl. ........................... 353/122; 353/79; 359/443; 359/460
[58] Field of Search ...................... 353/74, 72, 79, 353/122, 77; 359/443, 457, 456, 455, 460; 248/917, 919

[56] References Cited

U.S. PATENT DOCUMENTS

| | | | |
|---|---|---|---|
| 4,254,600 | 3/1981 | Zwissler | 52/281 |
| 4,406,519 | 9/1983 | Shaw | 359/443 |
| 4,730,897 | 3/1988 | McKechnie et al. | 350/128 |
| 4,984,871 | 1/1991 | Martinez | 350/117 |
| 5,185,677 | 2/1993 | Honda et al. | 359/460 |
| 5,317,449 | 5/1994 | Furuno et al. | 359/443 |
| 5,349,400 | 9/1994 | Kaplan et al. | 353/77 |

OTHER PUBLICATIONS

IEEE Transactions on Consumer Electronics, vol. CE-31, No. 3, Aug. 1985, "Ultra-Wide Viewing Angle Rear Projection Television, Screen", R. Bradley, Jr., et al., pp. 185-193.

Primary Examiner—William Dowling
Attorney, Agent, or Firm—Joseph S. Tripoli; Joseph J. Laks; Francis A. Davenport

[57] ABSTRACT

A projection television display screen has a plurality of mountings affixed to a cabinet. The plurality of mountings provide rigid screen suspension in a vertical plane while permitting differential lateral movement of the screen relative to the mountings.

9 Claims, 2 Drawing Sheets

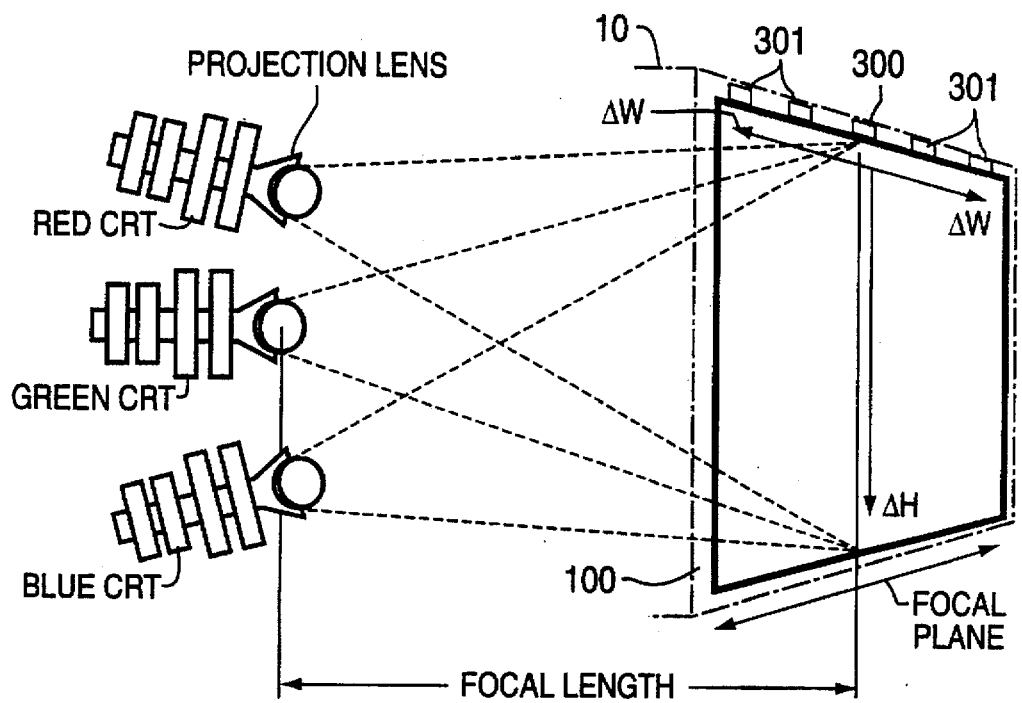
FIG. 1A
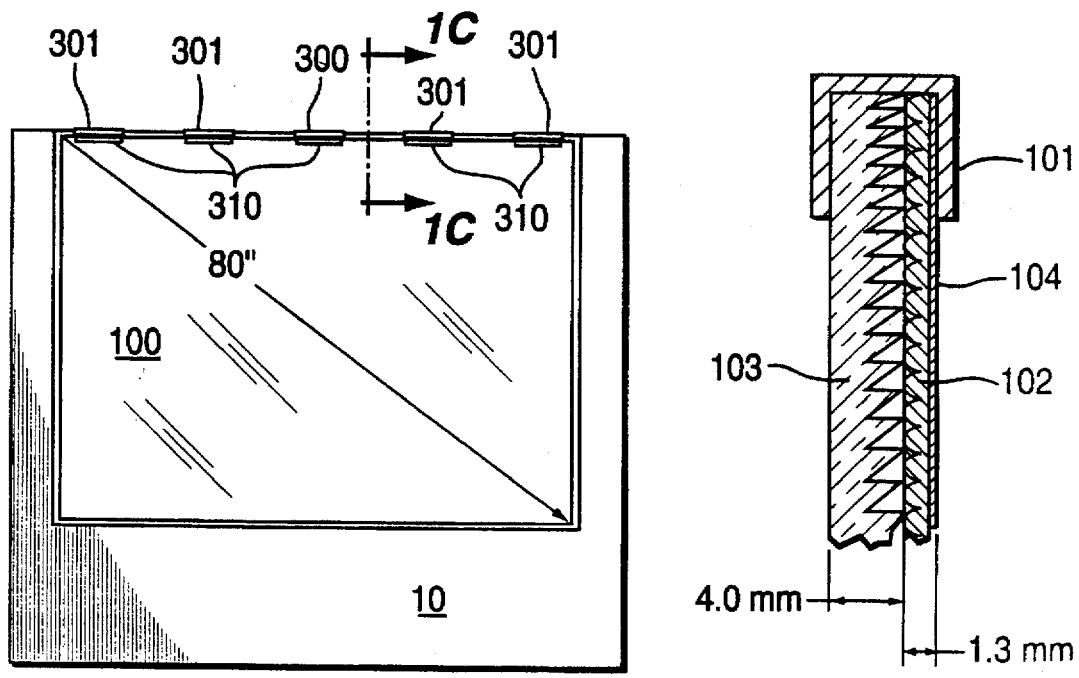
FIG. 1B  FIG. 1C

PROJECTION TELEVISION SCREEN MOUNTING

This invention relates to the field of video display by image projection, and in particular to the mounting a projection display screen.

BACKGROUND OF THE INVENTION

A projection screen typically comprises a combination of lens like layers which, in a color TV system, receive red, green and blue colored images and form a single multicolored image. A typical projection television display screen may comprise a circular Fresnel field lens, and focusing lens formed as a lenticular lens array. In simple terms the Fresnel lens serves to collimate or direct the image towards a viewing audience, with the lenticular lens shaping or spreading the projected image to form what is known as an audience viewing envelope. In a two part screen, such as that described, it is essential that the inner surfaces of the two lens remain essentially in contact under a normal range of temperature and humidity variations. Separation of the two lens surfaces may result in viewable image deficiencies, for example, localized defocusing, mis-convergence and localized brightness variations.

To assist in maintaining contact, frequently the lens surfaces may be manufactured with an inward bow. Thus when the lens surfaces are secured to each other with, for example, adhesive tape at a periphery, the bowing ensures contact over the whole surface area. Although the front and rear screen surfaces may not suffer any significant temperature difference the overall linear screen dimensions will change with temperature variations. Thus the mounting method employed for the projection screen must not, as a consequence of thermal related dimension change, introduce mechanical stressing or flexing such as to cause separation of the two lens surfaces, or to cause the screen to move from the focal plane of the projection lens.

SUMMARY OF THE INVENTION

A mounting arrangement for a video projection display screen, comprises a lateral support member and a plurality of clamp hangers. Each clamp hangers has a first part secured to the lateral support member and a second pan clamped to an edge of the screen. The first and second parts are interfitable for suspending the screen from the support member, so as to hold the screen edge without freedom of vertical movement while permitting differential lateral movement of the screen relative to the lateral support member.

BRIEF DESCRIPTION OF THE DRAWING

FIG. 1A illustrates in simplified form, CRT projectors imaged on to a screen having an inventive screen mounting.

FIG. 1B illustrates a projection television display employing the inventive screen mounting of FIG. 1A.

FIG. 1C shows a detailed section through the screen of FIG. 1B.

DETAILED DESCRIPTION

Figure 2:
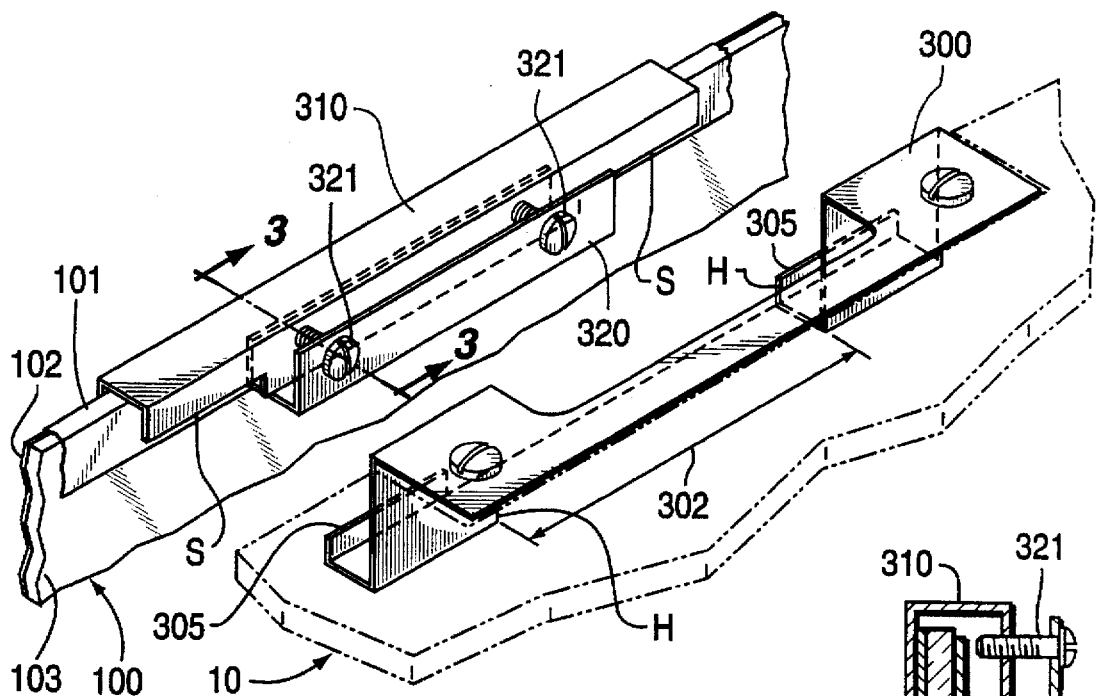
FIG. 2 is a partially assembled view of the inventive screen mounting arrangement shown in FIG. 1A.

A simplified cathode ray tube projection display is illustrated FIG. 1A. Three cathode ray tubes display red, green and blue colored images respectively. Each CRT is coupled to a projection lens which provides focusing and magnification such as to form a focused, converged, single image on or within a projection screen 100. Typically CRT projection displays employ a folded light path which is usually provided by a mirror surface, such a mirror has been omitted from the simplified illustration of FIG. 1. Screen 100 typically comprises a combination of lens like layers and is suspended by an inventive screen mounting comprising elements 300, 301 and 310.

FIG. 1B illustrates a front view of a projection television receiver comprising a cabinet 10, with a decorative facia removed to show the back projection screen 100, suspended with clearance at the sides and bottom. The screen is advantageously suspended by mountings 300, 301 and 310. The screen provides a display image diagonal dimension of eighty inches and hence has a display height of approximately forty eight inches and a display width of approximately sixty four inches. The screen comprises a circular Fresnel field lens and focusing lens formed as a lenticular lens array. In simple terms the Fresnel lens serves to collimate or direct the projected image towards a viewing audience with the lenticular lens shaping or spreading the projected image in the horizontal plane to form what is known as an audience viewing envelope. Since it is essential to maintain contact between Fresnel and lenticular lens, both lens surfaces are manufactured with a slight inward bow. Hence, when the lens surfaces are secured to each other around the periphery of the screen, the bowed surfaces ensure contact over the whole screen area. Bowing in the assembled screen is largely removed when the assembly is attached to the cabinet.

A partial section through screen 100 is shown in FIG. 1C. Screen 100 comprises a Fresnel field lens surface 103, and a lenticular lens array surface 102, for focusing. Diffusion filtering is provided by bulk diffusion within the lenticular lens 102 and by surface treatment of the front surface 104. The two lens surfaces are joined at the screen edge, by an adhesive tape 101, which is wrapped over the edges as shown in FIG. 1C.

The screen surfaces are held in contact by the manufactured bow and the adhesive tape securing the edges. However, to minimize the possibility of generating forces at the mounting points an inventive suspension mounting is utilized. The mounting combines rigid vertical suspension with an ability to compensate for lateral differential screen displacements, which otherwise may stress the lens surfaces and tend to cause separation, or deviation of the screen surfaces from the focal plane of the projection lens. Five mountings points are indicated in FIG. 1B. Hanger 300 is attached to the cabinet in a central position and couples with a caliper 310. Similarly for the remaining four hangers 301, which are attached to the cabinet and couple with their respective calipers 310. Mountings 300 and 301 are generally the same, however clamp clearance aperture 302, of mounting 300 is narrower than that of mountings 301, and is explained with reference to FIGS. 2 and 4.

The inventive screen mounting clamp hanger is illustrated a partially assembled view in FIG. 2. The operation of the advantageous clamp hanger may be explained as follows. The top edge of screen 100 is trapped and held within caliper 310. The advantageous assemblies, comprising caliper 310, clamp 320 and screws 321 are secured or clamped to the screen edge, the screen is then suspended on mounting hooks 305 of hangers 300 and 301.

In FIG. 2, a front top edge of cabinet 10 is illustrated in the area of the central hanger, mounting 300. The cabinet edge is recessed to accommodate the top surface of mounting 300, which is secured to the cabinet by two screws as shown. Mounting 300, may for example, be fabricated by a casting or extrusion, and comprises essentially three specific parts, a mounting surface, which has holes for attachment to the cabinet, a pair of hangers 305, and an aperture 302. Aperture 302 is provided to accommodate clamp 320 and clamp screws 321 when secured to the screen and suspended from hangers 305. Mounting 300 has a narrower clamp clearance aperture 302 than the apertures of mountings 301. The narrower aperture allows for manufacturing and mounting tolerances of the screen and clamp. However aperture 302 of mounting 300, provides for only a minor degree of lateral expansion of the screen. For example lateral expansion of the screen may cause the edge or shoulder of support surface S, of caliper 310, to contact the side of hanger 305, which corresponds to edge H of aperture 302. Thus, mounting 300 may be considered to be a mechanical reference point about which expansion and contraction of the screen and it's mountings may occur. Mountings 301 have larger clamp clearance apertures 302, such that assembly alignment tolerances and thermally related dimension changes are accommodated by lateral sliding movement of support shoulder 310 S on hangers 305. Differential expansion or contraction of the screen between clamping points may also result in a sliding repositioning of the clamp, thus localized mechanical stress is prevented and the possibility of screen layer distortion or separation is avoided. Clearly vertical expansion and contraction will occur relative to the mounting support surfaces 310 S and 305, i.e. the bottom edge of the screen will move relative to the top edge which is clamped. In effect the any differential change in screen dimensions will occur relative to mounting 300, as indicated in a lateral direction by $\Delta W$, and in a vertical direction by $\Delta H$, of FIG. 1A.

Figure 3:
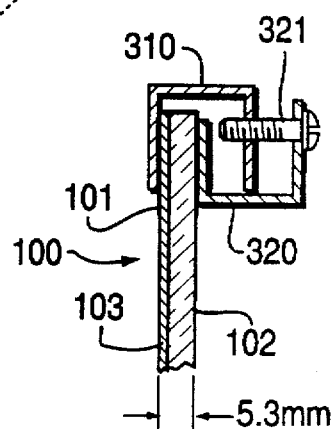
FIG. 3 is a section through part of the inventive mounting of FIG. 2.

FIG. 3 is a section through caliper 310, clamp 320 and clamping tension screw 321, at section line 3/3. The advantageous clamp hanger may be assembled and utilized as follows. Clamp 320 includes two clearance holes into which clamp tension screws 321 are inserted. Clamp 320 and screws 321 are positioned to couple with caliper 310 as shown in FIG. 3. Caliper 310 includes two holes 312, which may be threaded, may accept self threading screws or may utilized threaded inserts. However, screws 321 mate with which ever coupling method is employed. Screws 321 are inserted and engaged with, or forms threads in hole 312, of caliper 310. The clamp assembly, comprising caliper 310, clamp 320 and screws 321 are positioned over the edge of the screen, as shown in FIG. 3. The clamp tension screws 321 are tightened to a torque of 30 inch pounds, drawing clamp 320 closer to the threaded caliper surface and compressing tape 101 attached to the top edge of the screen. Thus the screen edge is trapped and secured within caliper 310 by the compressive force applied by screws 321 via clamp 320. The screen, with mounting clamps attached, is hung from hangers 305 of mounts 300 and 301.

A screen with clamping assemblies was subjected to a 100 hour thermal cycling test to asses the "holding" performance with clamp tension screws 321 when torqued to 30 inch pounds. The screen was suspended and maintained for 100 hours at an elevated temperature of 104° F. Following screen stabilization at nominal room temperature, screws 321 were measured and found to have a reduced torque setting of between of 25–28 inch pounds, a value which is quite sufficient for reliable, durable screen mounting. This reduction in torque is thought to be due to local deformation of the screen sandwich in the clamping area as a result of expansion. The screws were reset to 30 inch pounds and a further test was conducted for 100 hours at a reduced temperature of 0° F. Subsequent torque measurements revealed screw torques of between 28 and 30 inch pounds.

Figure 4:
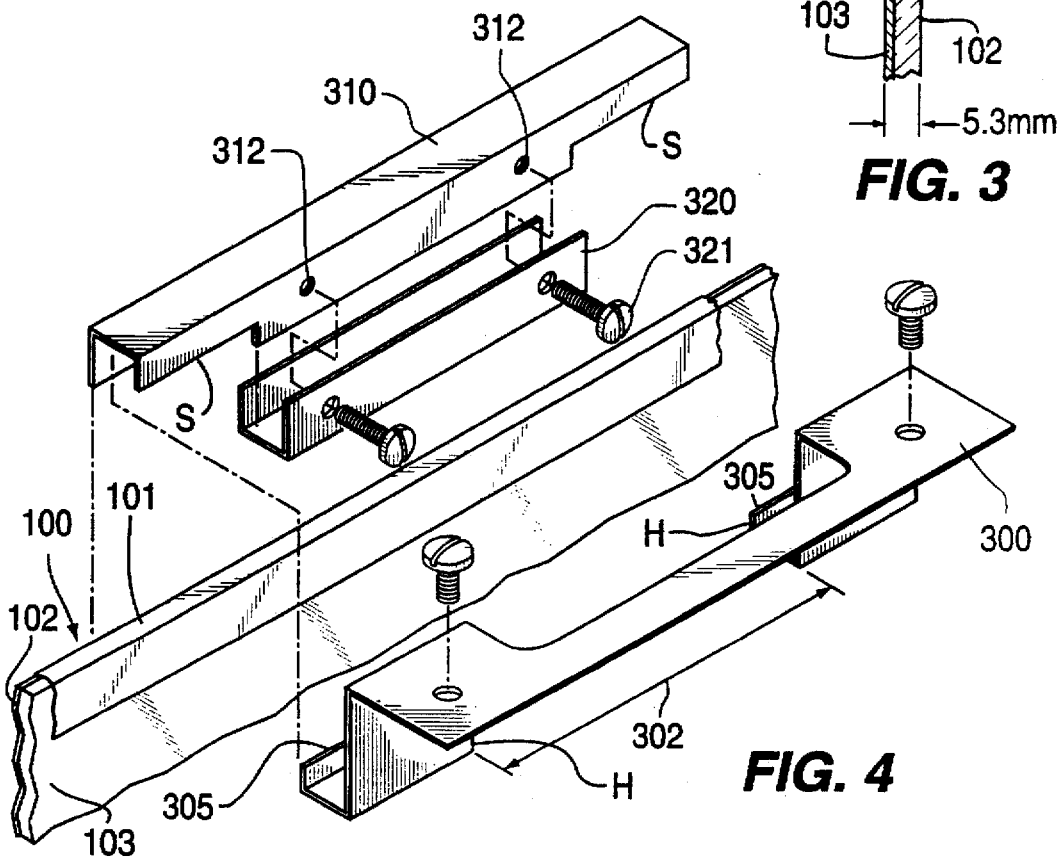
FIG. 4 is a disassembled view of the inventive screen mounting arrangement shown in FIGS. 2 and 3.

Each of the various parts shown in FIGS. 2, 3 and 4 may exhibit dimensional changes when subject to temperature variation. For example, the cabinet if made of wood products, maybe considered stable since it's coefficient of expansion is and order of magnitude less than that of the aluminum mounting. Similarly the steel caliper and clamp may expand by approximately one fourth that of the acrylic materials of the screen. For example, over a specific temperature range the dimensional change in clamp 320 length was calculated to be $2.4*10^{-3}$ inches, however the change in screen size over the same length of acrylic material was calculated to be $10*10^{-3}$ inches.

Since the screen represents a large area, for example, approximately 21 square feet, the effects of linear expansion will be considerably more evident. For example, over the same temperature range, the change in screen width was calculated to be $166*10^{-3}$ inches. However, this dimensional change is distributed about the center support 300, with the result that the sides of the screen move by half the calculated distance or approximately $83*10^{-3}$ inches. If the lateral positions of support 310S shoulders relative to their respective hangers 305 were observed over the temperature range, the displacement would be greater for the supports towards the screen edge and would reduce to virtually zero at the center hanger. Since the size differential is distributed relative to the center hanger, the clearance between the screen edge and the cabinet may be symmetrical and reduced to a minimum. Thermally related mechanical stressing of the screen lens "sandwich" is avoided by suspending the screen from the top edge with clearance provided at the sides and bottom, as illustrated in FIG. 1B. The inventive screen mounting rigidly grips the screen and provides vertical suspension whilst advantageously allowing lateral differential dimensional change by virtue of the slidable support coupling between shoulder surface 310S and hanger 305. Thus lateral expansion of the screen, depicted by arrows $\Delta W$ in FIG. 1A, is accommodated and potential problems of screen lens separation, screen deformation or differential movement of screen surfaces are avoided. Similarly expansion of the screen in the vertical direction is accommodated by virtue of the advantageous suspended mounting and vertical clearance.

What is claimed is:

1. A mounting arrangement for a video projection display screen, comprising:

a lateral support member;

a plurality of clamp hangers, each having a first part secured to said lateral support member and a second part clamped to an edge of a screen; and, said first and second parts being interfitable for suspending said screen from said support member, so as to hold said screen edge without freedom of vertical movement while permitting differential lateral movement of said screen relative to said lateral support member.

2. The mounting arrangement of claim 1, wherein differential lateral movement occurs about one of said plurality of clamp hangers responsive to dimensional changes of said screen.

3. The mounting arrangement of claim 1, wherein said differential movement of said first and second parts occurs responsive to thermally generated dimensional changes.

4. The mounting arrangement of claim 1, wherein at least one of said clamp hangers is provided with a slideable coupling allowing for said differential lateral movement.

5. The mounting arrangement of claim 1, wherein said clamp hangers maintain said screen position substantially in a focal plane of said projected image over a range of temperatures.

6. A mounting arrangement for a video projection display comprising:

a support member;

a screen having two layers and joined along an edge, for displaying a projected image;

a plurality of mounting clamps secured to an edge of said screen; and, a plurality of mounting hangers affixed to said support member where ones of said plurality couple with a mating surface of ones of said plurality of clamps to provide rigid support in a vertical direction and slidable support in a lateral direction.

7. The mounting arrangement of claim 6, wherein said slidable support accommodates dimensional changes of said screen in a lateral direction.

8. The mounting arrangement of claim 6, wherein said slidable support accommodates a differential lateral movement of said screen and clamps relative to said hangers.

9. The mounting arrangement of claim 6, wherein contact between said layers of said screen is sustained during screen dimension changes by differential lateral movement of said screen and clamps relative to said hangers.

* * * * *